United States Patent
Okuyama et al.

(10) Patent No.: US 6,682,834 B2
(45) Date of Patent: Jan. 27, 2004

(54) MAGNETIC STORAGE MEDIUM HAVING A HIGH RECORDING DENSITY

(75) Inventors: Chiaki Okuyama, Higashine (JP); Reiko Murao, Higashine (JP); Atsushi Endo, Higashine (JP); Akira Kikuchi, Higashine (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/805,415

(22) Filed: Mar. 13, 2001

(65) Prior Publication Data

US 2002/0037441 A1 Mar. 28, 2002

(30) Foreign Application Priority Data

Sep. 25, 2000 (JP) ........................... 2000-291144

(51) Int. Cl.$^7$ .............. G11B 3/68; G11B 3/70; H01F 10/08; H01F 10/12; H01F 10/14

(52) U.S. Cl. ................. 428/694 T; 428/694 TM; 428/694 TS; 427/127; 427/130; 252/62.51 R; 252/62.55; 252/62.56; 252/62.58

(58) Field of Search ............... 428/694 T, 694 TM, 428/694 TS, 457, 332; 252/62.51 R, 62.58, 62.55, 62.56; 427/127, 130

(56) References Cited

U.S. PATENT DOCUMENTS 5,759,681 A * 6/1998 Hosoe et al. ............. 428/332
5,851,643 A * 12/1998 Honda et al. ............. 428/212
6,150,015 A * 11/2000 Bertero et al. ............. 428/332
6,221,508 B1 * 4/2001 Kanbe et al. ............. 428/617
6,255,006 B1 * 7/2001 Ohnami et al. .......... 428/694 TS
6,274,233 B1 * 8/2001 Yoshikawa et al. ........ 428/332

FOREIGN PATENT DOCUMENTS

| JP | 7073427 | | 3/1995 |
| JP | 8031638 | | 2/1996 |
| JP | 08031638 A | * | 2/1996 |
| JP | 8124141 | | 5/1996 |

OTHER PUBLICATIONS

Human assisted machine translation of JP08–31638.*

* cited by examiner

Primary Examiner—Holly Rickman
Assistant Examiner—Nikolas J. Uhlir
(74) Attorney, Agent, or Firm—Greer, Burns & Crain, Ltd.

(57) ABSTRACT

A magnetic storage medium includes a magnetic layer of a Co alloy of a system Co—Cr—Pt—B—Cu, wherein the magnetic layer has a thickness t and a remnant magnetic flux density $B_r$ satisfying a relationship $(t \times B_r)$ 2.0 nT·m $\leq (t \times B_r) \leq 7.0$ nT·m, wherein the Co alloy contains, in addition to Co, Cr with a concentration $\beta$ of 20–26 at % (20 at % $\leq \beta \leq$ 26 at %), Pt with a concentration $\gamma$ of 6–20 at % (6 at % $\leq \gamma \leq$ 20 at %), B with a concentration $\delta$ of 1–7 at % (1 at % $\leq \delta \leq$ 7 at %), and Cu with a concentration $\epsilon$ of 2–7 at % (2 at % $\leq \epsilon \leq$ 7 at %).

16 Claims, 16 Drawing Sheets

MAGNETIC STORAGE MEDIUM HAVING A HIGH RECORDING DENSITY

CROSS-REFERENCE TO RELATED APPLICATION

The present application is based on Japanese priority application No.2000-291144 filed on Sep. 25, 2000, the entire contents of which are hereby incorporated by reference.

BACKGROUND OF THE INVENTION

The present invention generally relates to magnetic storage of information and more particularly to a magnetic storage medium for use in high-density magnetic information storage devices.

With recent advancement in the field of information processing, magnetic disk devices, particularly those used in computers and other information processing apparatuses as external or auxiliary information storage device, are exposed to a stringent demand of more recording density, more resolution, and higher signal-to-noise ratio.

In a general magnetic recording medium for a longitudinal magnetic recording, a pulse width $Pw_{50}$ of a reproduced magnetic signal is defined as $$Pw_{50} = (2(a+d)^2 + (a/2)^2)^{1/2}$$
$$a \propto (t \times B_r/H_c)^{1/2} \quad (1)$$

wherein $H_c$ represents a coercive force of a magnetic layer provided in the magnetic recording medium, $B_r$ represents a remnant magnetic flux density in the magnetic layer, t represents the thickness of the magnetic layer, and d represents a magnetic spacing between the magnetic layer and a magnetic head.

The narrower the width $Pw_{50}$ of the magnetic pulse, the better the resolution of the reproduced signal. Thus, in order to increase the recording density and resolution of the magnetic storage medium, it is effective to reduce the thickness t of the magnetic layer and increase the coercive force $H_c$ thereof.

Meanwhile, there is another demand for a high-density magnetic storage medium, in relation to the requirement of minimizing a medium noise, in that the magnetic layer has a high S/Nm (signal-to-medium noise) ratio. In order to suppress the medium noise, it has been practiced to reduce the grain size of the magnetic particles in the magnetic layer and suppress the magnetic interaction between the magnetic particles as much as possible.

For example, Japanese Laid-Open Patent Publication 3-31638 describes a magnetic storage medium that uses a magnetic layer of a Co-alloy film containing therein Cr and Ta with respective concentration levels of 6–20 at % (atomic percent) and 9 at %, wherein improvement is achieved in the foregoing prior art magnetic storage medium with regard to the S/Nm ratio by incorporating Cu with a concentration level of 0.5–7 at %. By doing so, it is possible to reduce the particle size in the Co alloy film used in the magnetic storage medium as the magnetic layer.

However, the demand for higher density recording has become more stringent these days, and it was discovered by the inventor of the present invention that the magnetic layer of the foregoing prior art composition can no longer meet for the demand of recent, leading-edge magnetic storage devices. Further, no solution has been proposed conventionally for improving anisotropy magnetic field $H_k$ and for preventing degradation of the coercive force $H_c$ under the situation that the product ($t \times B_r$) is set small for improved resolution and for improved S/Nm ratio.

In a magnetic storage media for use in high-density magnetic storage devices, it is noted that there is a serious problem known as thermal fluctuation. When the thickness of the magnetic layer is reduced or the grain size of the magnetic crystals therein is reduced extremely for improved resolution and improved S/Nm ratio, there is a tendency that magnetic relaxation is promoted in the magnetic layer and the remnant magnetization of the magnetic layer is degraded as a result.

Thus, the phenomenon of thermal fluctuation has to be suppressed as much as possible particularly in the case of high-density magnetic storage medium, while this minimization of the thermal fluctuation has to be accompanied with simultaneous minimization of the product ($t \times B_r$) for minimization of medium noise and also for simultaneous improvement of resolution.

It is known that the relaxation time $\tau$ of a magnetic layer is represented, according to the Nee-Arrhenius relationship as $$\tau^{-1} = f_0 \exp(-\Delta E/kT)$$
$$\Delta E = K_u \cdot V \cdot (1 - H/H_0)^{1/n}; \; n = \tfrac{2}{3},$$
$$K_u = H_k \cdot M_s/2, \; H = H_e + H_d, \quad (2)$$

where $f_0$ represents a spin precession frequency having an order of $10^9$/s, k represents Boltzmann's constant, T represents a temperature of the magnetic layer, $K_u$ represents an anisotropy energy constant, V represents an effective volume of a magnetic particle in the magnetic layer, $H_0$ represents an intrinsic coercive force in the absence of thermal fluctuation, $M_s$ represents a saturated magnetization, $H_e$ represents an external magnetic field, $H_d$ represents a demagnetization field at the bit transition, and $H_k$ represents an anisotropy magnetic field.

Referring to Eq.(2) above, it is noted that the attempt to reduce the medium noise by reducing the product ($t \times B_r$) invites a decrease of the relaxation time $\tau$ by way of causing a reduction of the particle volume V or causing reduction of the saturation magnetic field Ms. When the relaxation time $\tau$ is reduced, the resistance of the magnetic layer against thermal fluctuation is degraded and the strength of the output signal reproduced from the magnetic storage medium may become smaller with time.

In view of the foregoing, a demand has emerged recently for a technology that can maintain a high value for the product ($K_u \times V$), so that a sufficient resistance is maintained against thermal fluctuation while simultaneously minimizing the product ($t \times B_r$).

It should be noted that the coercive force $H_c$ of a magnetic layer is a function of temperature and time. Thus, the coercive force $H_c$ appears low when the measurement of the coercive force is conducted at a high temperature.

A remnance coercive force $H_{cr}$ is given as $$H_{cr}/H_0 = 1 - \{C \cdot \ln(f_0 \cdot t_{im}/\ln 2)\}^n$$
$$C^{-1} = \Delta E/kT \quad (3)$$

where $t_{im}$ represents the duration in which the external magnetic field $H_e$ is applied.

From Eq.(3), it can be seen that the coercive force $H_c$ is degraded in the magnetic recording medium susceptible to thermal fluctuation when the product ($t \times B_r$) is reduced. With the degradation of the coercive force $H_c$, the resistance to thermal fluctuation is degraded and also the S/Nm ratio.

As noted previously, it is desirable to design the magnetic layer of the magnetic storage medium such that a large coercive force $H_c$ is maintained even when the product $(t \times B_r)$ is set small. However, various magnetic properties of the magnetic layer are interrelated, and thus, it has been extremely difficult to make a magnetic storage medium that maintains a high coercive force $H_c$ for the magnetic layer therein even when the value of the product $(t \times B_r)$ is reduced.

SUMMARY OF THE INVENTION

Accordingly, it is a general object of the present invention to provide a novel and useful magnetic storage medium wherein the foregoing problems are eliminated.

Another and more specific object of the present invention is to provide a magnetic storage medium for high-density magnetic recording having a large coercive force $H_c$ for a magnetic layer therein even in such a case the value of the product $(t \times B_r)$ is set small.

Another object of the present invention is to provide a magnetic storage medium, comprising:

a non-magnetic substrate;

an under layer provided on said non-magnetic substrate; and at least one magnetic layer provided above said under layer, said magnetic layer comprising at least an alloy layer of a system Co—Cr—Pt—B—Cu, said alloy layer having a thickness t and a remnant magnetic flux density $B_r$ satisfying a relationship for a product $(t \times B_r)$ as $$2.0\ nT \cdot m \leq (t \times B_r) \leq 7.0\ nT \cdot m,$$

said alloy layer containing, in addition to Co, Cr with a concentration β of 20–26 at % (20 at %≦β≦26 at %), Pt with a concentration γ of 6–20 at % (6 at %≦γ≦20 at %), B with a concentration δ of 1–7 at % (1 at %≦δ≦7 at %), and Cu with a concentration ε of 2–7 at % (2 at %≦ε≦7 at %).

According to the present invention, it is possible to maintain a desired coercive force $H_c$ of about 2000 (×¼π·kA/m) or more even in such a case the product $(t \times B_r)$ of the magnetic layer is reduced to the level of 2.0–7.0 nT·m (nano-Tesla·meter). Thus, the present invention can achieve the improvement in the resolution at the time of reading and the elimination of medium noise simultaneously. The magnetic recording medium of the present invention further has a superior magnetic anisotropy and is resistant against thermal fluctuation. In the case the total of the atomic percentages of Cr, Pt, B and Cu in the magnetic layer is 55 at % (β+γ+δ+ε=55 at %), the magnetic layer contains Co with a concentration of 45 at %.

It should be noted that the magnetic layer may have a thickness t of 10–25 nm in the magnetic storage medium of the present invention, provided that the product $(t \times B_r)$ falls in the foregoing range between 2.0 and 7.0 nT·m. The magnetic layer may be included in the magnetic storage medium in one or more layers. By providing the magnetic layer in two or more layers, it is possible to reduce the remnant magnetic flux density $B_r$ further while maintaining the high coercive force $H_c$. Alternatively, the magnetic storage medium may contain the magnetic layer as one of a plurality of magnetic layers therein.

Other objects and further features of the present invention will become apparent from the following detailed description when read in conjunction with the attached drawings.

DETAILED DESCRIPTION OF THE INVENTION

[First Embodiment]

Figure 1:
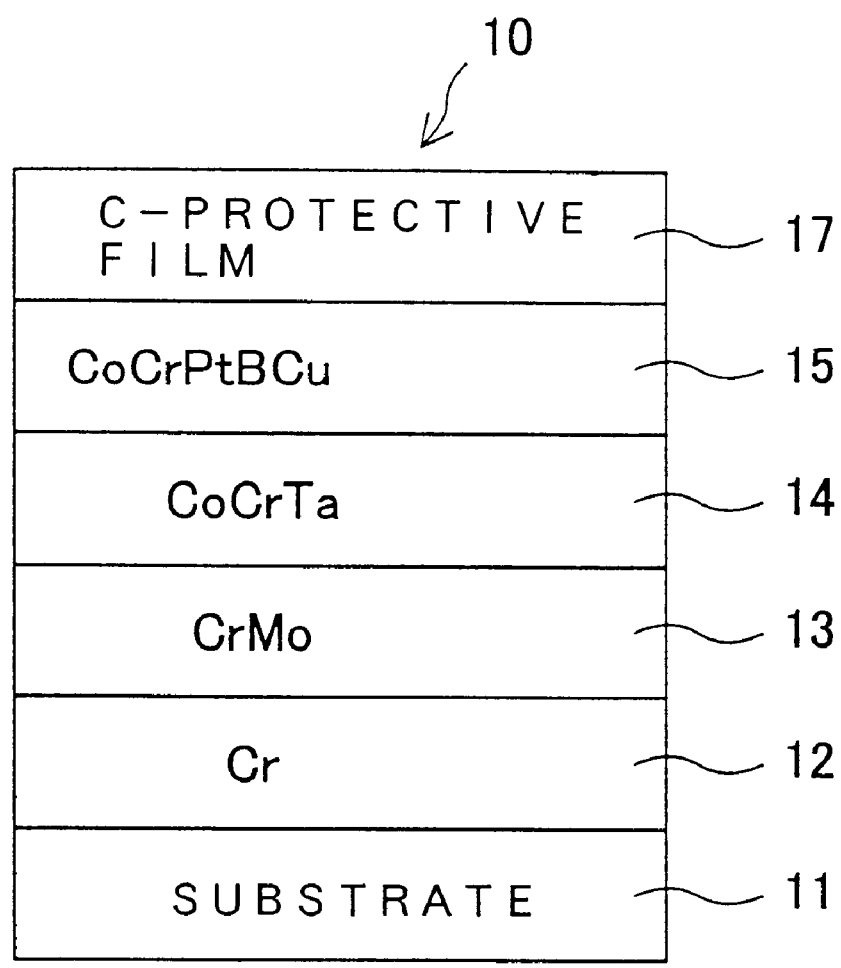
FIG. 1 is a diagram showing the construction of a magnetic storage medium according to a first embodiment of the present invention.

FIG. 1 shows the construction of a magnetic storage medium 10 according to a first embodiment of the present invention.

Referring to FIG. 1, the magnetic storage medium 10 is constructed on a non-magnetic substrate 11 of typically Al and includes a magnetic layer 15 of a Co alloy covered by a C protective coating 16, wherein the substrate 11 is covered with a NiP layer (not shown) deposited by a non-electrolytic plating process. The surface of the NiP layer thus formed is preferably subjected to a texture process.

On the substrate 11, there is provided a non-magnetic under layer 12 of Cr or Cr alloy, and an optional non-magnetic under layer 13 is provided on the under layer 12, wherein the use of a Cr alloy is preferable for the under layer 12, in view of in-plane alignment of crystals in the magnetic layer 15 to be formed later, in the event the layer 12 alone is provided as the under layer. In the event the under layer 13 is provided in addition to the under layer 12, it is preferable to increase the Cr content in the under layer 12 located closer to the substrate 11 and decrease the Cr content in the under layer 13 away from the substrate 11.

In the construction of FIG. 1, the under layer 12 is formed of pure Cr, while the under layer 13 is formed of a CrMo alloy. The CrMo alloy for the under layer 13 may further contain one or more of Ta, Ti, W or V.

The magnetic layer 15 is formed of a Co alloy in the system of Co—Cr—Pt—B—Cu and contains Cr, Pt, B and Cu in addition to Co with respective, predetermined concentrations. It should be noted that the magnetic layer 15 may be formed of a single layer of the Co alloy or may include more than two layers. In the event the magnetic layer 15 includes two or more Co alloy layers, the entire Co layers may have a common composition or the composition may be changed layer by layer. In the illustrated example, the magnetic layer 15 is formed of a single Co alloy layer of the system Co—Cr—Pt—B—Cu.

Further, the magnetic storage medium 10 of FIG. 1 includes an optional intermediate layer 14 of preferably a Co alloy between the under layer 13 and the magnetic layer 15. In the illustrated example, the intermediate layer 14 is formed of a Co alloy of the system Co—Cr—Ta and has a thickness of 1–5 nm.

The magnetic layer 15 thus formed is covered by a DLC (diamond-like carbon) protection film 17.

The magnetic storage medium 10 is fabricated on the non-magnetic substrate 11 by using a conventional deposition process. Thus, the Al substrate 11 is coated with the NiP film explained before by a non-electrolytic plating process, and a texture processing is applied to the NiP film thus formed. Further, the under layer 12 of Cr and the under layer 13 of CrMo are deposited consecutively on the surface of the Al substrate 11 thus processed, by conducting a sputtering process. Further, the magnetic layer 15 of the Co—Cr—Pt—B—Cu and the protection layer 17 of C are deposited consecutively.

The sputtering process of the under layers 12 and 13 may be conducted in an Ar atmosphere under the pressure of 0.67 Pa at a substrate temperature of 220° C. In order to avoid contamination by oxygen, it is preferable to evacuate the sputtering chamber before the sputtering process to a pressure of $4 \times 10^{-5}$ Pa or less.

In an example, the Cr layer 12 is formed with a thickness of 6 nm, while the CrMo under layer 13 is formed with a thickness of 4 nm. Further, the CoCrTa intermediate layer 14 is formed with a thickness of 1 nm, the CoCrPtBCu magnetic layer 15 is formed with a thickness of 10–25 nm, and the DLC protective film 17 is formed with a thickness of 6 nm.

In the foregoing deposition process of the under layers 12 and 13, the inventor of the present invention has discovered that an improvement is obtained with regard to the S/Nm ratio of the magnetic layer 15 when the substrate temperature is set to the range of 160–300° C. at the beginning of the deposition of the layers 12 and 13.

It should be noted that the magnetic layer 15 used in the magnetic storage medium 10 of FIG. 1 is required to maintain a large coercive force $H_c$ even when the product $(t \times B_r)$ is set small. As noted before, t represents the thickness of the magnetic layer 15 and $B_r$ represents the remnant magnetic flux density in the magnetic layer 15.

In order to meet for the foregoing demand, the magnetic storage medium 10 of FIG. 1 uses the Co alloy in the system of Co—Cr—Pt—B—Cu for the magnetic layer 15 with respective concentrations α, β, γ, δ, and ε represented in terms of atomic percent, such that there holds a relationship $$20 \leq \beta \leq 26,$$

$$6 \leq \gamma \leq 20,$$

$$1 \leq \delta \leq 7,$$

$$2 \leq \epsilon \leq 7,$$

and $$\alpha+\beta+\gamma+\delta+\epsilon=100.$$

Figure 2:
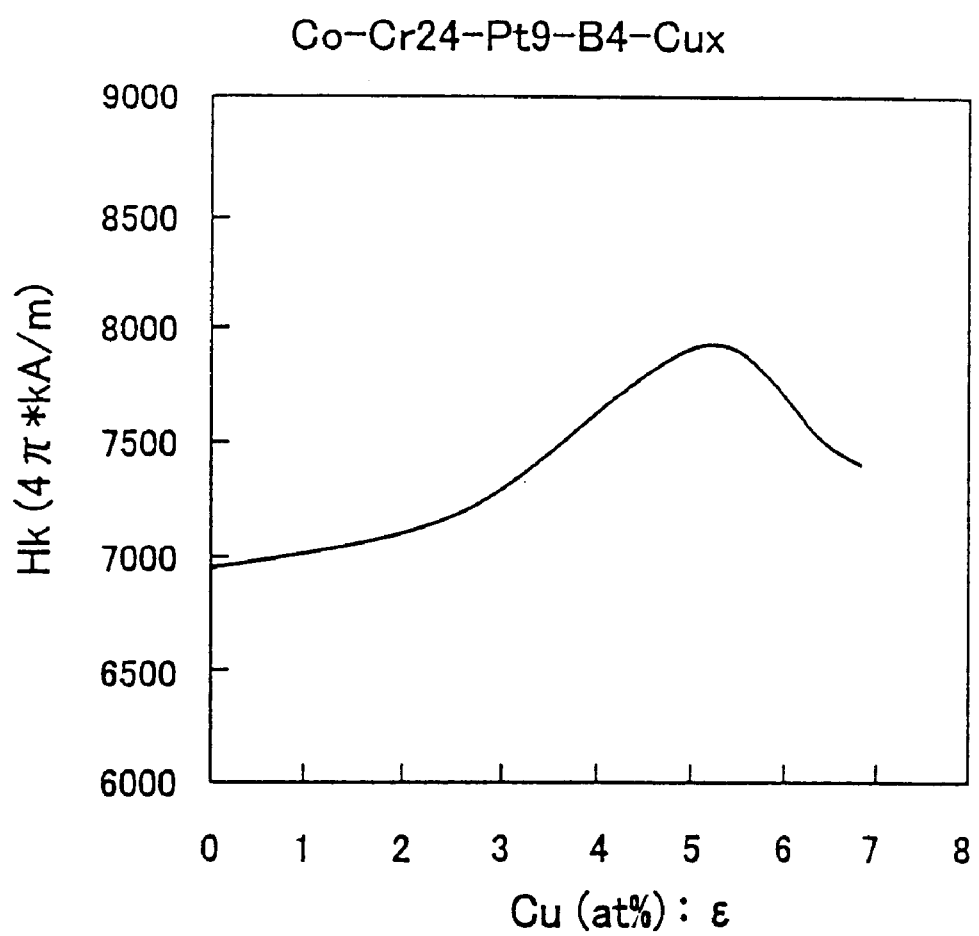
FIG. 2 is a diagram showing a magnetic property of a magnetic layer used in the magnetic storage medium of FIG. 1.

FIG. 2 shows the relationship between the anisotropy magnetic field $H_k$ and the Cu content ε in the magnetic layer 15 having a specific composition of β=24, γ=9 and δ=4, while changing the Cu content ε from 0 to 7 with a division of 1 at %.

Referring to FIG. 2, it can be seen that there is a clear dependence for the anisotropy magnetic field $H_k$ on the Cu content ε and that a remarkable improvement is achieved for the anisotropy magnetic field $H_k$ when the Cu content ε is set in the range between 2 and 7 at % ($2 \leq \epsilon \leq 7$), particularly in the range between 3 and 7 at % ($3 \leq \epsilon \leq 7$). As explained previously, such an improvement of the anisotropy magnetic field $H_k$ is one of the conditions which have to be met in order to improve the resistance of the magnetic layer 15 against thermal fluctuation.

Figure 3:
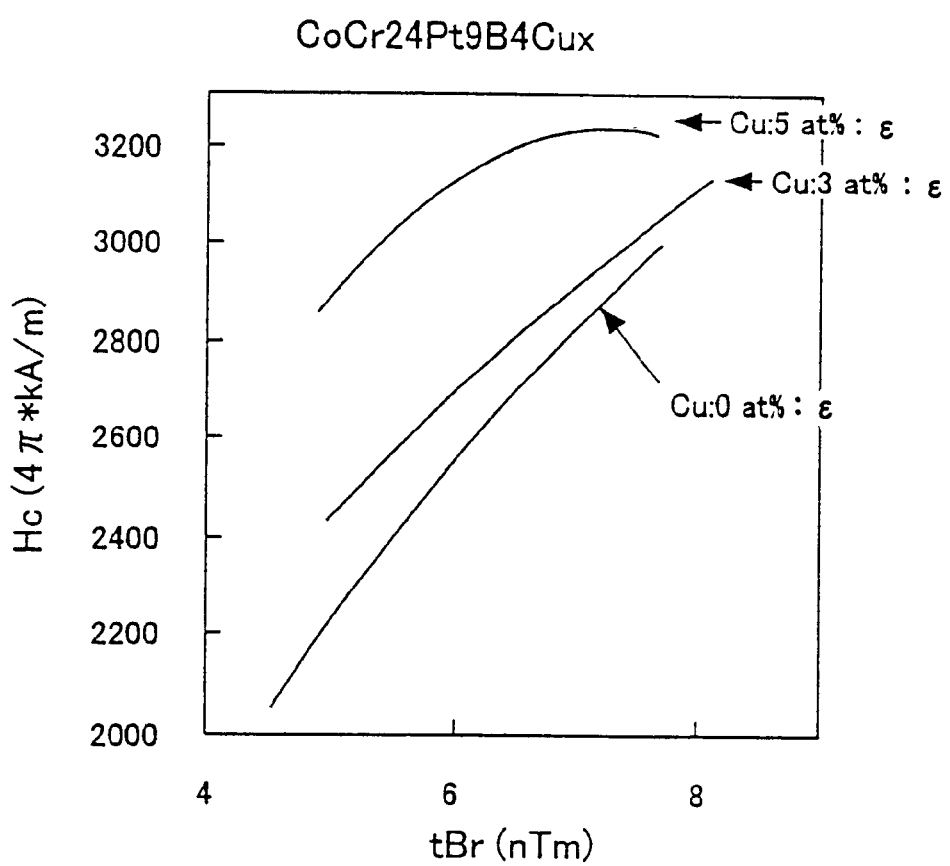
FIG. 3 is another diagram showing a magnetic property of a magnetic layer used in the magnetic storage medium of FIG. 1.

FIG. 3 shows the relationship between the coercive force $H_c$ and the product $(t \times B_r)$ of the magnetic layer 15 for various Cu concentrations ε. Similarly to the case of FIG. 2, the magnetic layer 15 has a specific composition of β=24, γ=9 and δ=4, and the Cu content ε is changed variously.

Referring to FIG. 3, it can be seen that the coercive force $H_c$ shows a general dependence on the product $(t \times B_r)$ in such a manner that the coercive force $H_c$ increases generally with the value of the product $(t \times B_r)$. This relationship is particularly clear in the magnetic layer 15 that is free from Cu (ε=0 at %).

Further, FIG. 3 indicates that the foregoing general tendency between the coercive force $H_c$ and the product $(t \times B_r)$ is modified somewhat when Cu is introduced into the magnetic layer 15 and that there appears a region in which a high coercive force $H_c$ is maintained even when the value of the product $(t \times B_r)$ is reduced, as represented particularly in the case of ε=5 at %.

Conventionally, it has been difficult to maintain a large coercive force $H_c$ when the value of the product $(t \times B_r)$ is reduced. The present invention eliminates this difficulty by incorporating Cu into the magnetic layer 15.

Figure 4:
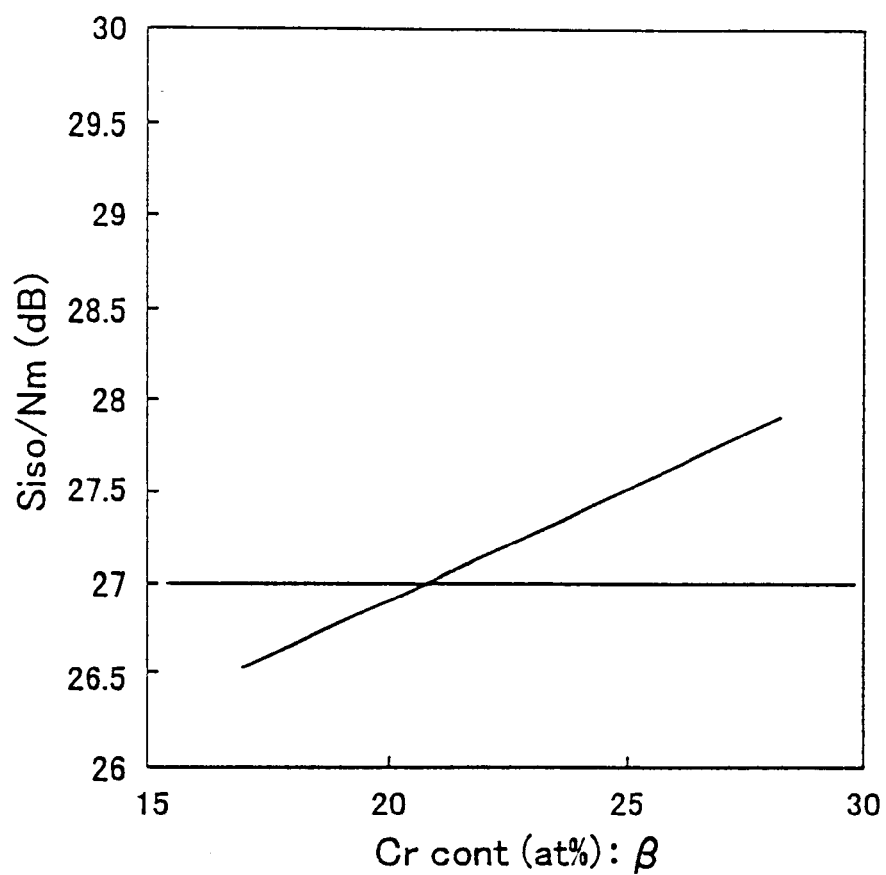
FIG. 4 is a further diagram showing an Siso/Nm property of a magnetic layer used in the magnetic storage medium of FIG. 1.

FIG. 4 shows the relationship between a $S_{iso}$/Nm ratio, which is a S/Nm ratio for an isolated wave, and the Cr concentration β. Similarly as before, the result of FIG. 4 is obtained for the magnetic layer 15 having the composition satisfying the relationship $20 \leq \beta \leq 26$, $6 \leq \gamma \leq 20$, $1 \leq \delta \leq 7$, $2 \leq \epsilon \leq 7$, and α+β+γ+δ+ε=100 while changing the Cr concentration β variously.

Referring to FIG. 4, it can be seen that the $S_{iso}$/Nm ratio shows a dependence on the Cr concentration β and that an S/N value exceeding 27 dB is achieved when the Cr concentration $\beta$ is increased beyond the value of 20 at %.

Conventionally, it was reported in the Japanese Laid-Open Patent Publication 8-31638 op. cit., based on the experiments in which the Cr concentration $\beta$ is changed from 6 to 20 at %, that no satisfactory S/N ratio is obtained by way of incorporation of Cr into the magnetic layer 15 of a Co alloy. The result of FIG. 4 demonstrates, on the other hand, that a satisfactory S/N ratio is achieved when the Cr concentration $\beta$ is increased beyond the value of 20 at %. It is believed that, in the conventional case in which the Cr concentration $\beta$ in the magnetic layer 15 is less than 20 at %, the precipitation of Cr at the grain boundary of the magnetic particles in the layer 15 is insufficient and a relatively large magnetic interaction has been caused between the magnetic particles in the magnetic layer 15.

Thus, from FIG. 4, it is concluded that the Cr concentration $\beta$ in the magnetic layer 15 is set preferably larger than about 20 at %.

Figure 5:
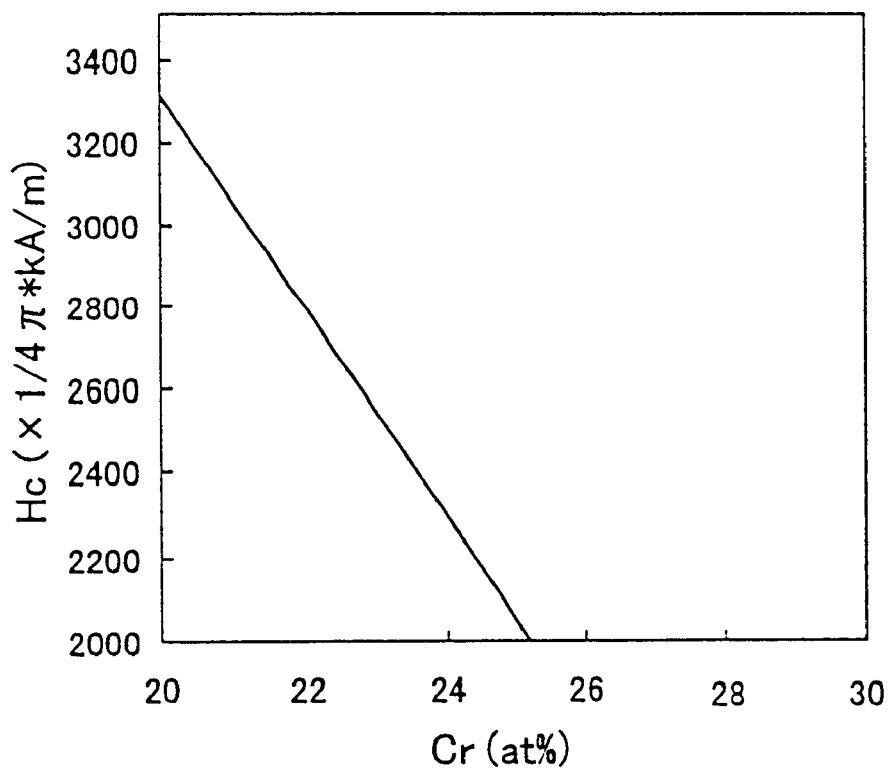
FIG. 5 is a further diagram showing a magnetic property of a magnetic layer used in the magnetic storage medium of FIG. 1.

FIG. 5 shows the relationship between the Cr concentration $\beta$ in the magnetic layer 15 and the coercive force $H_c$ of the magnetic layer 15.

Referring to FIG. 5, it can be seen that the magnitude of the coercive force $H_c$ of the magnetic layer 15 decreases with increasing Cr concentration $\beta$ therein. Thus, when the Cr concentration $\beta$ is increased according to the relationship of FIG. 4 for improved S/N ratio, the coercive force $H_c$ of the magnetic layer 15 is decreased and the resolution at the time of reading the magnetic storage medium 10 is degraded.

Thus, in order to secure a desirable coercive force $H_c$ of 2000 ($\times \frac{1}{4}\pi$ kA/m) in the magnetic layer 15 for the case the layer 15 contains Pt and B with respective concentrations of 8 at % and 3 at %, it is preferable that the Cr concentration $\beta$ does not exceed 26 at %, although this upper limit value of the concentration $\beta$ may change depending on the concentration of Pt and B in the layer 15.

From the considerations above with reference to FIGS. 4 and 5, it is concluded that the desirable range of the Cr concentration $\beta$ is given for the magnetic layer 15 as $20 \leq \beta \leq 26$. When the composition $\beta$ is set as such, the magnetic layer 15 provides a large coercive force $H_c$ and simultaneously a high $S_{iso}$/Nm ratio.

As noted previously, the anisotropy magnetic field $H_k$ of the magnetic layer 15 is improved by incorporating Cu into the magnetic layer with the concentration $\epsilon$ such that the relationship $2 \leq \epsilon \leq 7$ is satisfied. Thereby, the magnetic storage medium 10 of FIG. 1 maintains a large coercive force $H_c$ even in the case the product ($t \times B_r$) is set small.

Figure 6:
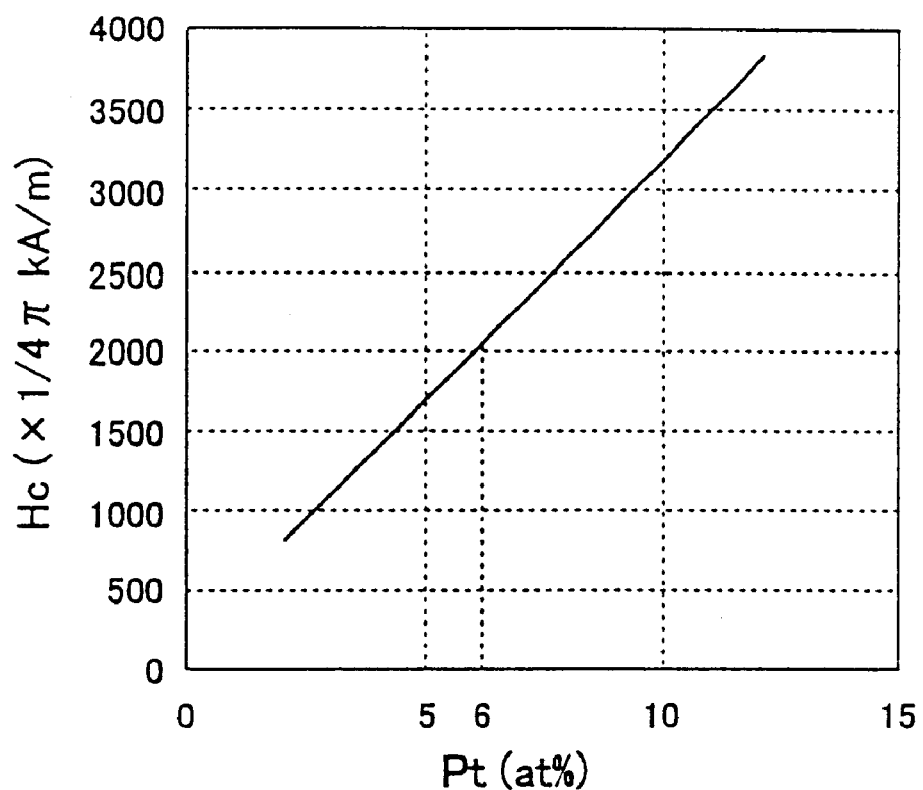
FIG. 6 is a further diagram showing a magnetic property of a magnetic layer used in the magnetic storage medium of FIG. 1.

FIG. 6 shows the relationship between the Pt concentration $\gamma$ and the coercive force $H_c$ of the magnetic layer 15.

Referring to FIG. 6, it can be seen that the coercive force $H_c$ of the magnetic layer 15 depends on the concentration $\gamma$ of Pt in the layer 15 and that the value of the coercive force $H_c$ increases with increasing concentration $\gamma$ of Pt. According to the relationship of FIG. 6, the coercive force $H_c$ increases monotonously with the concentration $\gamma$ at least up to the value of 12 at %. This means that a value of 6 at % is necessary for the concentration $\gamma$ of Pt in order to obtain a coercive force $H_c$ of 2000 ($\times 4/\pi$·kA/m) or more.

From the phase diagram of a Co—Pt binary alloy, it is known that an $\epsilon$-phase of Co (an hcp phase) is obtained in the range of $\gamma$ of 20 at % or less ($\gamma \leq 20$ at %). Thus, the desirable range of Pt in the magnetic layer 15 is determined, in view of the condition that the layer 15 shows a ferromagnetism and that a large coercive force $H_c$ is guaranteed, as being equal to or larger than 6 at % but not exceeding 20 at % ($6 \leq \gamma \leq 20$).

Figure 7:
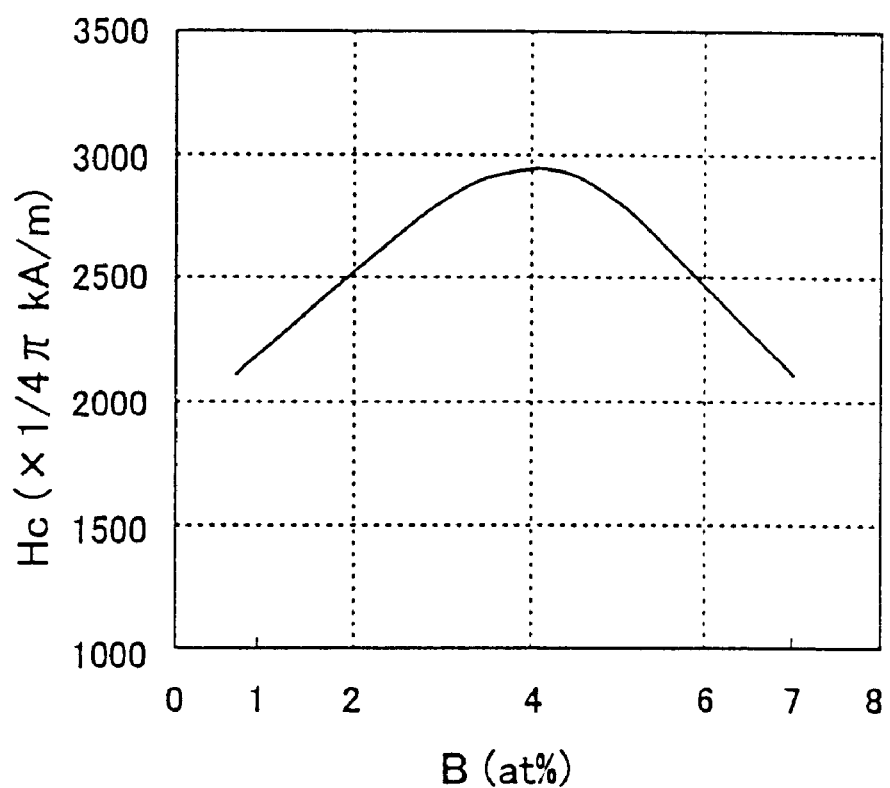
FIG. 7 is a further diagram showing a magnetic property of a magnetic layer used in the magnetic storage medium of FIG. 1.

FIG. 7 shows the relationship between the coercive force $H_c$ of the magnetic layer 15 and the concentration $\delta$ of B contained therein.

Referring to FIG. 7, the coercive force of 2000 ($\times \frac{1}{4}\pi$·kA/m) is obtained when the B concentration $\delta$ in the layer 15 is set to satisfy the relationship $2 \leq \gamma \leq 6$.

Figure 8:
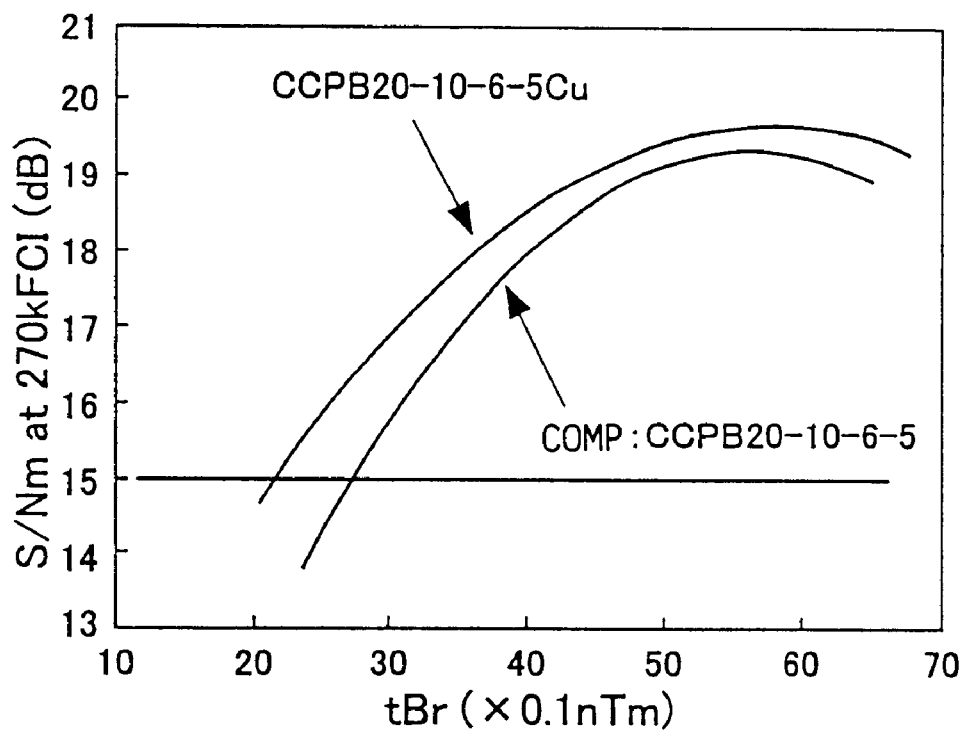
FIG. 8 is a further diagram showing an S/Nm property of a magnetic layer used in the magnetic storage medium of FIG. 1.

FIG. 8 shows the relationship between the product ($t \times B_r$) and the S/Nm ratio of the magnetic storage medium 10 having the magnetic layer 15 containing therein Co with 59 at %, Cr with 20 at %, Pt with 10 at %, B with 6 at % and Cu with 5 at %, for the case of reproducing a magnetic signal recorded thereon with the linear recording density of 270 kFCI, in comparison with the case in which the magnetic layer 15 contains Co with 64 at %, Cr with 20 at %, Pt with 10 at % and B with 6 at %.

From FIG. 8, it will be noted that the S/Nm ratio shows a dependence on the product ($t \times B_r$).

Thus, according to the present embodiment, it is possible to realize a magnetic storage medium having a magnetic layer 15 of a Co alloy in the system of Co—Cr—Pt—B—Cu such that the magnetic storage medium has a high S/Nm ratio and that the high S/Nm ratio is maintained even in such a case the product ($t \times B_r$) for the magnetic layer 15 is reduced. From FIG. 8, it can be seen that an S/Nm ratio of 15 dB or more can be obtained for the magnetic storage medium 10 of the present embodiment as long as the product ($t \times B_r$) has a value of 2 nTm or more.

In a magnetic storage device that uses a high-sensitivity GMR sensor, such as a spin-valve sensor, in a reading head, a sufficient output signal is obtained for the magnetic sensor when the value of the product ($t \times B_r$) is 7 nTm or less. Thus, the use of the magnetic storage medium 10 in such a magnetic storage device increases the total S/N ratio, which includes not only the effect of medium noise not but also the effect of noise from the magnetic head and processing circuit. According to the magnetic storage medium 10 of the present embodiment, it is possible to set the product ($t \times B_r$) such that the value thereof falls in the range between 2 and 7 nTm.

[Second Embodiment]

Figure 9:
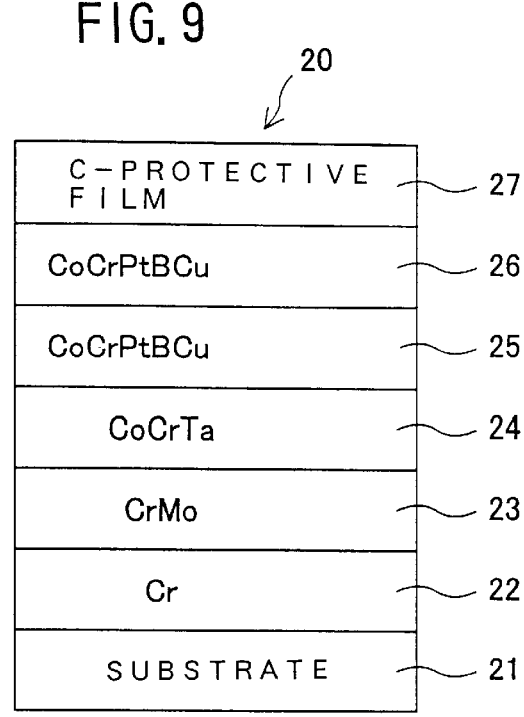
FIG. 9 is a diagram showing the construction of a magnetic storage medium according to a second embodiment of the present invention.

FIG. 9 shows the construction of a magnetic storage medium 20 according to a second embodiment of the present invention.

Referring to FIG. 9, the magnetic storage medium 20 includes a non-magnetic substrate 21, which may be an Al substrate coated with a NiP film by a non-electrolytic plating process.

The surface of the substrate 21 thus processed is subjected to a texture processing and under layers 22 and 23 of Cr and a CrMo alloy are deposited consecutively by a sputtering process.

Further, an intermediate layer 24 of a CoCrTa alloy is deposited on the under layer 23, and magnetic layers 25 and 26 of a Co alloy are deposited consecutively on the under layer 23, wherein the magnetic layer 25 contains, in addition to Co, Cr with 25 at %, Pt with 11 at %, B with 4 at % and Cu with 5 at %, while the magnetic layer 26 contains, in addition to Co, Cr with 20 at %, Pt with 10 at %, B with 6 at % and Cu with 5 at %. Thus, the magnetic layer 25 contains Co with 55 at % while the magnetic layer 26 contains Co with 59 at %.

On the magnetic layer 26, there is provided a DLC film 27 for surface protection.

In the magnetic storage medium 20 of the present embodiment, both of the magnetic layers 25 and 26 are formed of an alloy of the system Co—Cr—Pt—B—Cu, with respective, different compositions, wherein both compositions of the magnetic layers 25 and 26 satisfy the relationship of $20 \leq \beta \leq 26$, $6 \leq \gamma \leq 20$, $1 \leq \delta \leq 7$, $2 \leq \epsilon \leq 7$, and $\alpha+\beta+\gamma+\delta+\epsilon=100$. Thus, the magnetic storage medium 20 of the present embodiment can provide high resolution and low medium noise similarly to the magnetic storage medium 10 of the previous embodiment.

[Third Embodiment]

Figure 10:
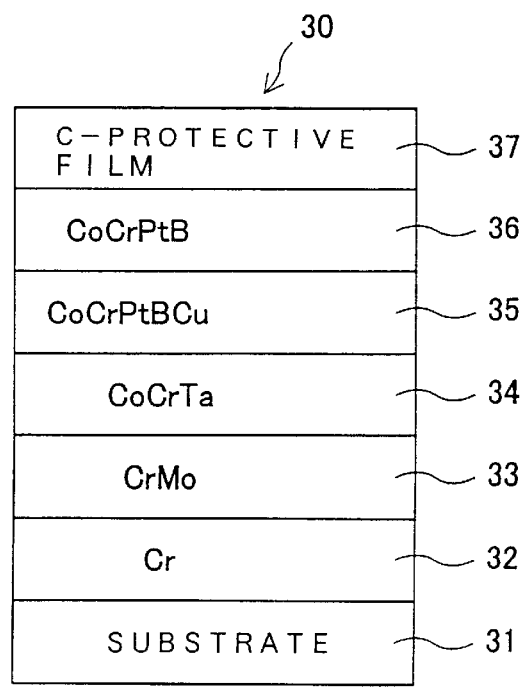
FIG. 10 is a diagram showing the construction of a magnetic storage medium according to a third embodiment of the present invention.

FIG. 10 shows the construction of a magnetic storage medium 30 according to a third embodiment of the present invention.

Referring to FIG. 10, the magnetic storage medium 30 includes a non-magnetic substrate 31, which may be an Al substrate coated with a NiP film by a non-electrolytic plating process.

The surface of the substrate 31 thus processed is subjected to a texture processing and under layers 32 and 33 of Cr and a CrMo alloy are deposited consecutively by a sputtering process.

Further, an intermediate layer 34 of a CoCrTa alloy is deposited on the under layer 33, and magnetic layers 35 and 36 of a Co alloy are deposited consecutively on the under layer 33, wherein the magnetic layer 35 is a Co alloy of the system Co—Cr—Pt—B—Cu and contains, in addition to Co, Cr with 25 at %, Pt with 11 at %, B with 4 at %, and Cu with 5 at %, while the magnetic layer 36 is a Co alloy of the system Co—Cr—Pt—B and contains, in addition to Co, Cr with 20 at %, Pt with 10 at %, and B with 6 at %. Thus, the magnetic layer 35 contains Co with 55 at % while the magnetic layer 36 contains Co with 34 at %.

On the magnetic layer 36, there is provided a DLC film 37 for surface protection.

In the magnetic storage medium 30 of the present embodiment, the magnetic layers 35 satisfies the relationship of $20 \leq \beta \leq 26$, $6 \leq \gamma \leq 20$, $1 \leq \delta \leq 7$, $2 \leq \epsilon \leq 7$, and $\alpha+\beta+\gamma+\delta+\epsilon=100$, while the magnetic layer 36 does not.

Even in such a case, the magnetic storage medium 30 of the present embodiment provides the advantageous feature of high resolution and low medium noise in view of the fact that the magnetic storage medium 30 contains at least one magnetic layer that satisfies the foregoing relationship.

[Fourth Embodiment]

Figure 11:
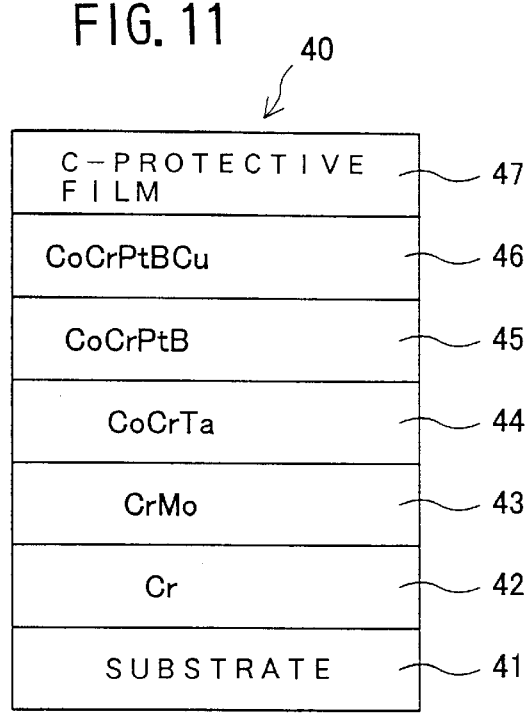
FIG. 11 is a diagram showing the construction of a magnetic storage medium according to a fourth embodiment of the present invention.

FIG. 11 shows the construction of a magnetic storage medium 40 according to a third embodiment of the present invention.

Referring to FIG. 11, the magnetic storage medium 40 includes a non-magnetic substrate 41, which may be an Al substrate coated with a NiP film by a non-electrolytic plating process.

The surface of the substrate 41 thus processed is subjected to a texture processing and under layers 42 and 43 of Cr and a CrMo alloy are deposited consecutively by a sputtering process.

Further, an intermediate layer 44 of a CoCrTa alloy is deposited on the under layer 43, and magnetic layers 45 and 46 of a Co alloy are deposited consecutively on the under layer 43, wherein the magnetic layer 45 is a Co alloy of the system Co—Cr—Pt—B and contains, in addition to Co, Cr with 25 at %, Pt with 11 at % and B with 4 at %, while the magnetic layer 46 is a Co alloy of the system Co—Cr—Pt—B—Cu and contains, in addition to Co, Cr with 20 at %, Pt with 10 at %, B with 6 at %, and Cu with 5 at %. Thus, the magnetic layer 45 contains Co with 50 at % while the magnetic layer 46 contains Co with 59 at %.

On the magnetic layer 46, there is provided a DLC film 47 for surface protection.

In the magnetic storage medium 40 of the present embodiment, the magnetic layer 46 satisfies the relationship of $20 \leq \beta \leq 26$, $6 \leq \gamma \leq 20$, $1 \leq \delta \leq 7$, $2 \leq \epsilon \leq 7$, and $\alpha+\beta+\gamma+\delta+\epsilon=100$, while the magnetic layer 45 does not.

Even in such a case, the magnetic storage medium 40 of the present embodiment provides the advantageous feature of high resolution and low medium noise in view of the fact that the magnetic storage medium 40 contains at least one magnetic layer that satisfies the foregoing relationship.

[Comparative Example]

Figure 12:
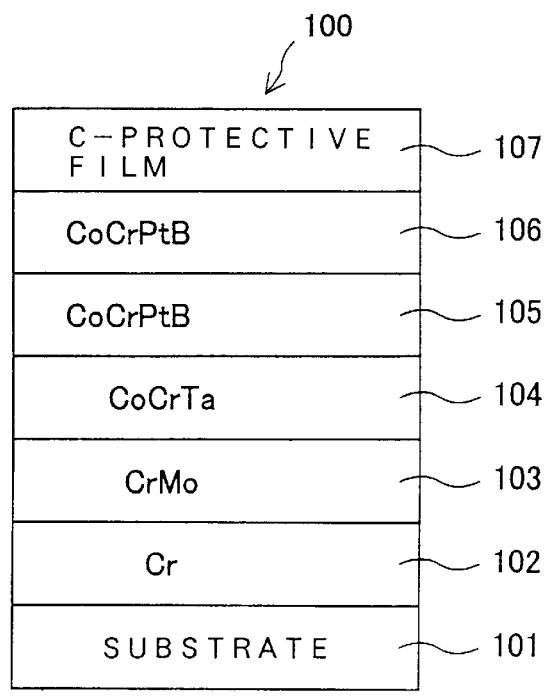
FIG. 12 is a diagram showing the construction of a reference magnetic storage medium used for a comparative experiment.

FIG. 12 shows the construction of a magnetic storage medium 100 not in compliance with the present invention.

Referring to FIG. 12, the magnetic storage medium 100 includes a non-magnetic substrate 101, which may be an Al substrate coated with a NiP film by a non-electrolytic plating process.

The surface of the substrate 101 thus processed is subjected to a texture processing and under layers 102 and 103 of Cr and a CrMo alloy are deposited consecutively by a sputtering process.

Further, an intermediate layer 104 of a CoCrTa alloy is deposited on the under layer 103, and magnetic layers 105 and 106 of a Co alloy are deposited consecutively on the under layer 103, wherein both of the magnetic layers 105 and 106 are formed of a Co alloy of the system Co—Cr—Pt—B, and the magnetic layer 105 contains, in addition to Co, Cr with 25 at %, Pt with 11 at % and B with 4 at %, while the magnetic layer 106 contains, in addition to Co, Cr with 20 at %, Pt with 10 at % and B with 6 at %.

On the magnetic layer 106, there is provided a DLC film 107 for surface protection.

Figure 13:
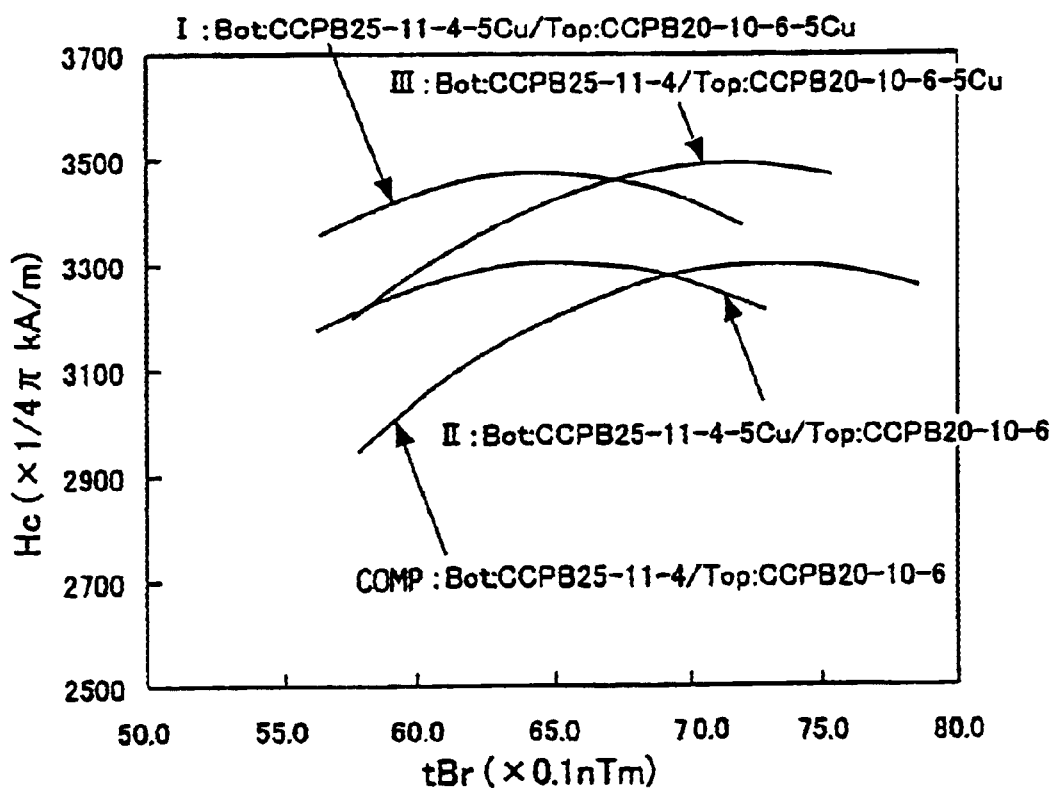
FIG. 13 is a diagram showing the magnetic properties of the magnetic storage devices according to various embodiments of the present invention in comparison with the reference magnetic storage medium of FIG. 12.

FIG. 13 shows the relationship between the coercive force $H_c$ and the product $(t \times B_r)$ for the magnetic storage medium 100 of FIG. 12 in comparison with similar relationship for the magnetic storage media 20–40 of FIGS. 9–11, wherein the relationship for the magnetic storage medium 100 of FIG. 12 is represented in FIG. 13 by a line designated as COMP, while the relationship for the magnetic storage media 20, 30 and 40 are represented in FIG. 13 by lines I, II and III, respectively. In correspondence to each of the lines I–III and COMP, there is given a designation of the composition of the top and bottom magnetic layers in FIG. 13. For example, the designation "Bot:CCPB25-11-4-5Cu/Top:CCPB20-10-6-5Cu" attached to the line I indicates that the bottom magnetic layer is formed of a Co alloy containing Cr with 25 at %, Pt with 11 at %, B with 4 at % and Cu with 5 at % and that the top magnetic layer is formed of a Co alloy containing Cr with 20 at %, Pt with 10 at %, B with 6 at % and Cu with 5 at % in correspondence to the structure of FIG. 9.

Referring to FIG. 13, it can be seen that the coercive force $H_c$ depends on the product $(t \times B_r)$ in any of COMP and I–III and that any of the magnetic storage media of the present invention, represented by the curves I–III, has a larger coercive force $H_c$ as compared with the magnetic storage media of the comparative experiment represented by COMP, particularly in the region where the product $(t \times B_r)$ has a small value of 5.5–7.0 nTm.

FIG. 13 further indicates that the foregoing improvement of the coercive force $H_c$ is enhanced in the magnetic storage medium represented by the curve I in which both the top and bottom magnetic layers contain Cu. In the case only the bottom magnetic layer contains Cu as represented by the curve II, the value of the coercive force $H_c$ is smaller as compared with the case of the curve I. Even in such a case, it is noted that the coercive force $H_c$ exceeds the coercive force for the curve COMP particularly in the region between 5.5–7.0 nTm. Further, in the case only the top magnetic layer contains Cu as represented by the curve III, the value of the coercive force $H_c$ becomes smaller than the case represented by the curve II when the product $(t \times B_r)$ has the value of about 5.5 nTm. However, it can be seen that the coercive force $H_c$ exceeds the value of the coercive force of the magnetic storage medium COMP and that the coercive force of the curve III increases and exceeds the coercive force of the curve I when the product $(t \times B_r)$ has the value of about 7.0 nTm.

In FIG. 13, it should be noted that the plotting of the coercive force $H_c$ is made only for the range of the product $(t \times B_r)$ between 5.5 and 8.0 in view of conventionally used range of the product $(t \times B_r)$. However, FIG. 13 clearly indicates that the magnetic storage medium according to the second through fourth embodiments of the present invention as represented by the curves I–III maintains the large coercive force $H_c$ even when the product $(t \times B_r)$ is reduced below 5.5 nTm. This applies also to the relationship explained with reference to FIG. 14 below.

Figure 14:
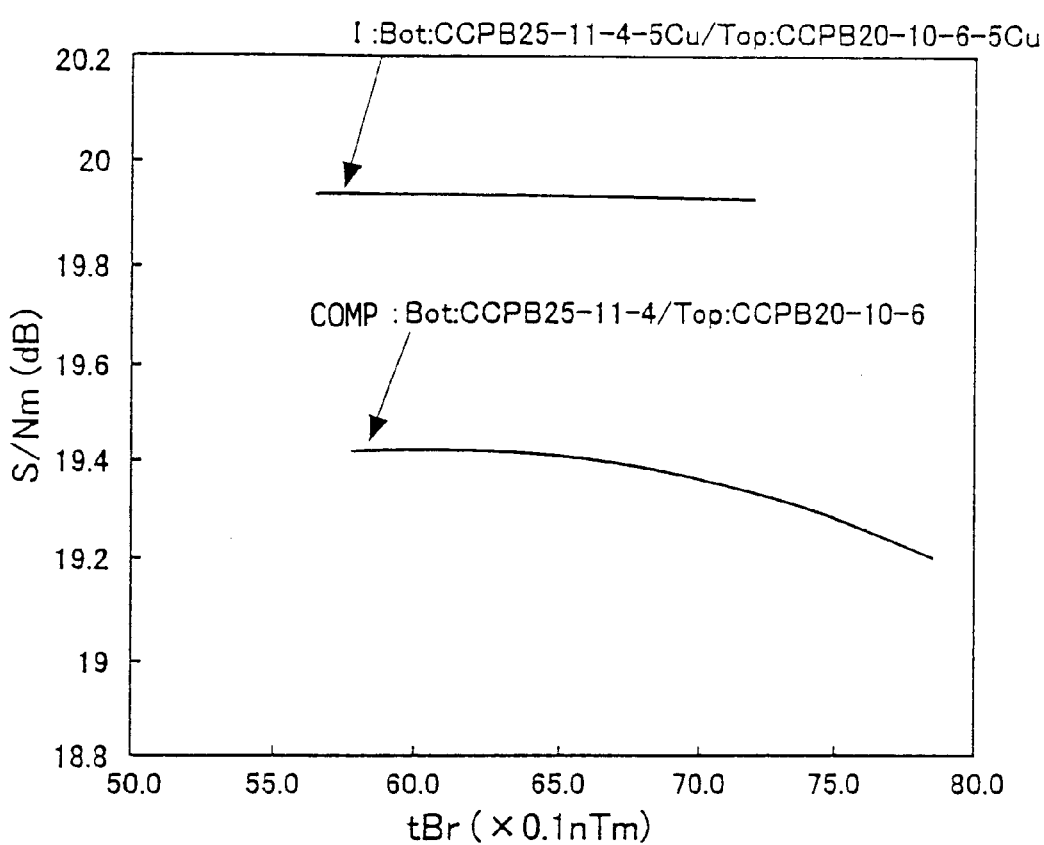
FIG. 14 is a diagram comparing the S/Nm property of the magnetic storage medium of FIG. 9 in comparison with the S/Nm property of the magnetic storage medium of FIG. 12.

FIG. 14 shows the relationship between the product $(t \times B_r)$ and the S/Nm ratio for the magnetic storage medium 20 of the second embodiment represented by a curve I in comparison with a similar relationship for the magnetic storage medium 100 of the comparative experiment represented by a curve COMP.

Referring to FIG. 14, it can be seen that the magnetic storage medium of the curve I has a much higher S/Nm ratio as compared with the magnetic storage medium of the curve COMP, even in the case the product $(t \times B_r)$ is reduced to 5.5–7.0 nTm or less.

In summary, the magnetic storage medium of the present invention achieves high S/Nm ratio and large coercive force $H_c$ essential for high-density recording of information even when the product $(t \times B_r)$ is reduced as a result of the use of a Co alloy of the system Co—Cr—Pt—B—Cu for the magnetic layer. By stacking such a magnetic layer in plurality of layers as in the construction of FIG. 9, it is possible to enhance the effect of the present invention.

Hereinafter, the effect of the under layer used in the magnetic recording medium of the present invention on the magnetic property of the magnetic storage medium will be examined.

As explained with reference to FIG. 6, the magnetic storage medium of the present invention uses a relatively high Pt concentration ($6 \leq \gamma \leq 20$ at %) for the magnetic layer 15 for achieving the desired large coercive force $H_c$. When the magnetic layer 15 contains Pt with such a high concentration level, it is necessary to minimize the lattice misfit between the crystal lattice constituting magnetic layer 15 and the crystal lattice constituting the under layer, which is formed primarily of Cr.

Thus, the present invention uses a Cr alloy containing one or more of Mo, Ta, Ti, W and V in addition to Cr for the under layer of the magnetic layer. By using such a Cr alloy for the under layer, the in-plane alignment of crystals in the magnetic layer is improved substantially.

Figure 15:
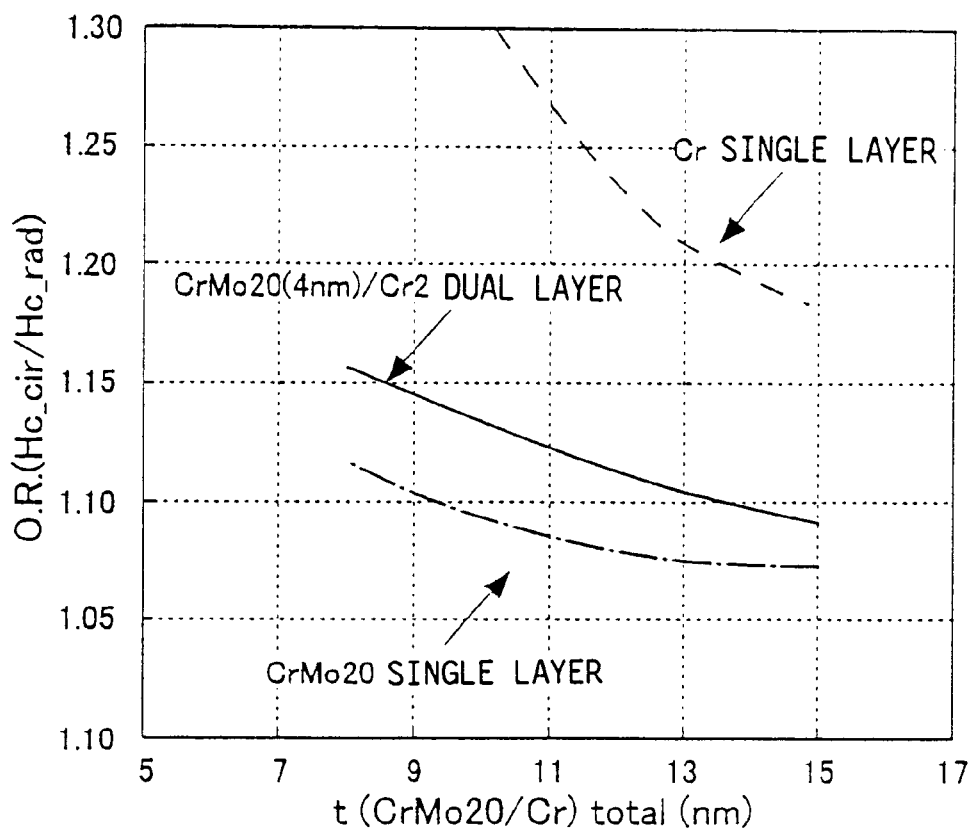
FIG. 15 is a diagram showing the effect of various under layers on the orientation ratio of a magnetic storage medium.

FIG. 15 shows an orientation ratio (O.R.), which is a ratio of the coercive force $H_c$ in the circumferential direction of the magnetic recording medium to the coercive force $H_c$ in the radial direction of the magnetic recording medium, as a function of the total thickness of the under layer for various under layers, including the case in which a single under layer of pure Cr is used and the case in which a single layer of a CrMo alloy containing Cr with 80 at % and Mo with 20 at % is used.

Referring to FIG. 15, it can be seen that the orientation ratio has a dependence on the total thickness of the under layer and that the use of a single Cr layer for the under layer improves the orientation ratio of the magnetic storage medium as compared with the case in which a single CrMo layer is used for the under layer.

It is believed that the foregoing improvement of the orientation ratio associated with the use of the single Cr layer for the under layer is caused as a result of different distortion mode of the Cr under layer in the circumferential direction and in the radial direction. More specifically, a pure Cr layer shows a large distortion in the circumferential direction as compared to the radial direction and that the circumferential/radial distortion ratio is larger in the pure Cr layer than in a CrMo alloy layer, and it is believed that this is the reason why the single under layer of Cr provides the largest orientation ratio as represented in FIG. 15.

In order to improve the in-plane alignment of crystals in the magnetic layer while simultaneously improving the orientation ratio of the coercive force, the magnetic storage device according to any of the preceding embodiments have used a lower under layer of Cr in combination with an upper under layer of CrMo. For example, the magnetic storage medium 10 of FIG. 1 uses the lower under layer 12 of Cr and the upper under layer 13 of CrMo. As represented in FIG. 15, the use of such a dual-layer structure for the under layer increases the orientation ratio as compared with the case of using a single CrMo alloy layer for the under layer while improving the in-plane alignment of crystals in the magnetic layer 15. Particularly, it was confirmed from the experiments conducted by the inventor of the present invention, by measuring the coercive force in the in-plane direction and in the vertical direction of the magnetic layer, in that the foregoing under layer of the dual-layer structure is advantageous for improving the in-plane crystal alignment in the magnetic layer.

When it is necessary to provide a single-layer structure for the under layer, it is preferable to use a CrMo alloy layer for improving the in-plane crystal orientation in the magnetic layer.

[Fifth Embodiment]

Figure 16:
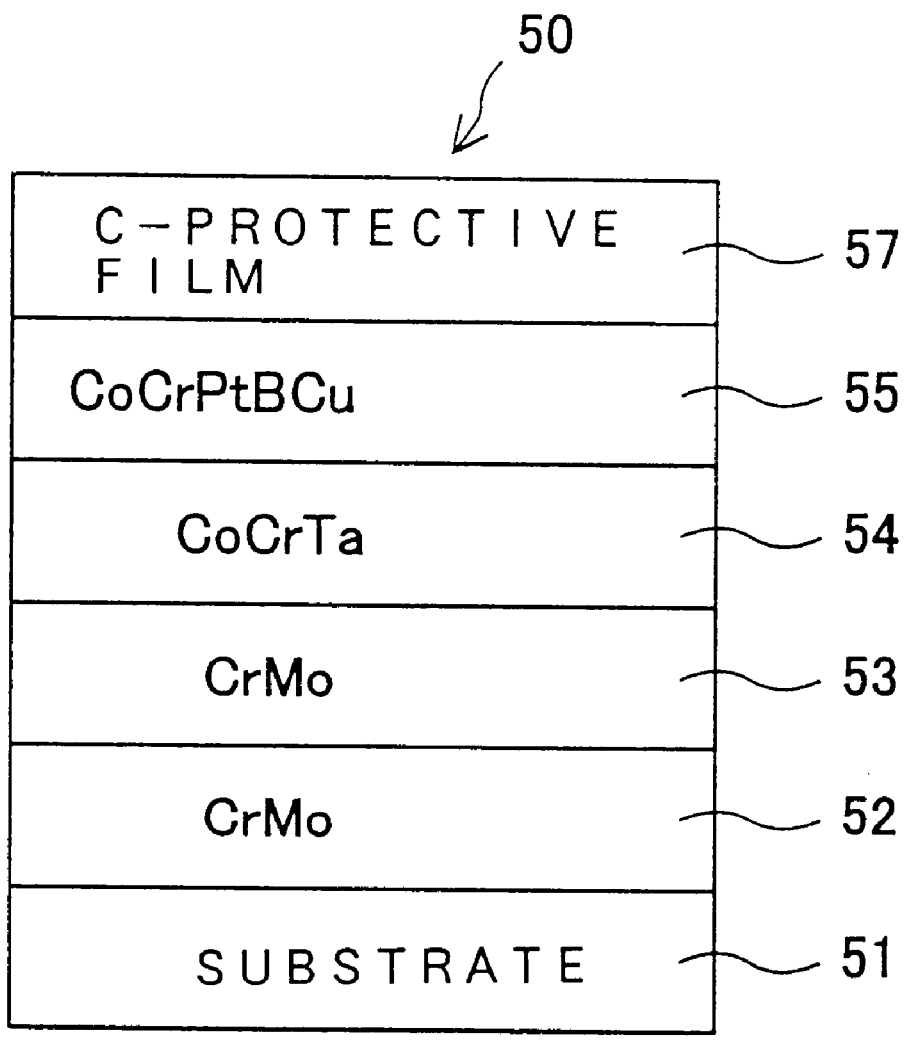
FIG. 16 is a diagram showing the construction of a magnetic storage medium according to a fifth embodiment of the present invention.

FIG. 16 shows the construction of a magnetic storage medium 50 according to a fifth embodiment of the present invention.

Referring to FIG. 16, the magnetic storage medium 50 is constructed on a non-magnetic substrate 51 coated with a NiP layer (not shown) and subjected to a texture processing, and includes a lower under layer 52 of a CrMo alloy and an upper under layer 53 of another CrMo alloy, wherein the CrMo alloy constituting the layer 52 contains Cr with a larger concentration level as compared with the CrMo alloy constituting the layer 53 for achieving the compatibility of in-plane crystal alignment and reduction of lattice misfit.

Further, an intermediate layer 54 of a Co alloy in the system of Co—Cr—Ta is provided on the upper under layer 53 with a thickness of 1–5 nm and a magnetic layer 54 of a Co alloy in the system of Co—Cr—Pt—B—Cu is provided on the under layer 53, wherein the intermediate layer 54 takes an hcp structure and improves the in-plane alignment of c-axis of the crystals in the magnetic layer 55. The effect of facilitating the in-plane crystal alignment is enhanced when the proportion of the magnetic component in the intermediate layer 54 is reduced and diminished when the proportion of the magnetic component in the layer 54 is increased. Thus, it is advantageous to decrease the magnetic component in the intermediate layer 54 in view point of enhancing the in-plane crystal orientation.

On the other hand, excessive decrease of the magnetic component in the intermediate layer 54 results in a problem of increased saturation flux density Bs, and because of this, it becomes necessary to reduce the thickness of the magnetic layer excessively when the value of the product ($t \times B_r$) of the magnetic layer 55 is adjusted in compliance with the condition of the present invention. As such excessive decrease of the thickness t of the magnetic layer 55 is undesirable due to the decrease of the coercive force $H_c$, it is preferable to set the saturated magnetic density $B_s$ in the range between 0.4–0.6 T.

[Sixth Embodiment]

Next, a magnetic disk drive according to a sixth embodiment of the present invention will be described with reference to FIGS. 17 and 18 respectively showing a cross-sectional view and a plan view, wherein the magnetic disk drive uses a magnetic storage medium according to any of the preceding embodiments.

Figure 17:
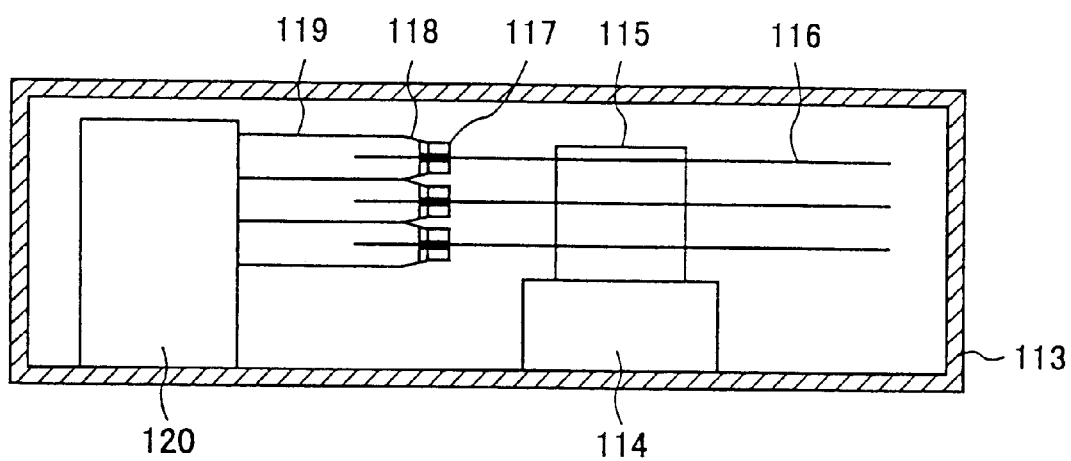
FIG. 17 is a diagram showing the construction of a magnetic storage device according to a sixth embodiment of the present invention in a cross-sectional view.
Figure 18:
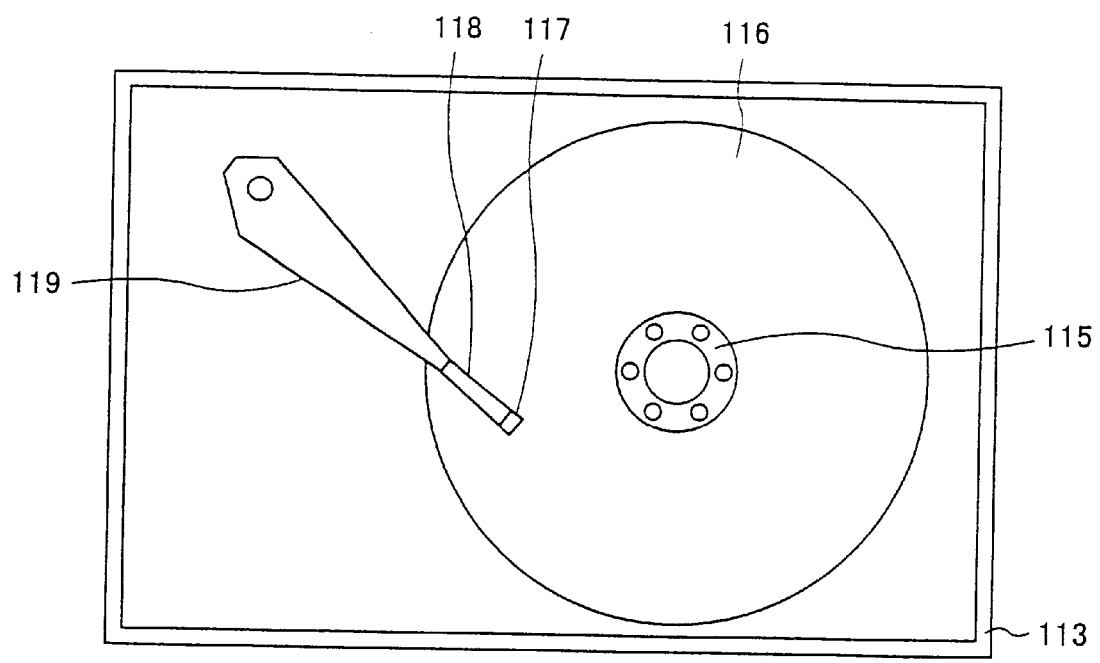
FIG. 18 is a diagram showing the construction of the magnetic storage device of FIG. 17 in a plan view.

Referring to FIGS. 17 and 18, the magnetic disk drive includes a housing 113 accommodating therein a motor 114 and a hub 115 connected to the motor 114, wherein a plurality of magnetic disks 116, which may be any of the magnetic storage media 10–50, are mounted commonly on the hub 115 to form a magnetic disk assembly. Adjacent to the magnetic disk assembly, there is provided an actuator unit having a rotatable shaft, and a plurality of swing arms 119 are connected to the rotatable shaft for a swinging motion in response to the actuation of the actuator 120.

Each of the swing arms 119, in turn, carries thereon a magnetic head 117 via a corresponding suspension mechanism 118 and the magnetic head 117 scans over the surface of the magnetic disk generally in a radial direction in response to the actuation of the actuator 120.

By using any of the magnetic storage media 10–50 of the present invention for the magnetic disk 116, it is possible to improve the resolution at the time of reading of information from the magnetic disk 116 while simultaneously minimizing the S/Nm ratio.

Further, the present invention is not limited to the embodiments described heretofore, but various variations and modifications may be made without departing from the scope of the invention.

What is claimed is:

1. A magnetic storage medium for longitudinal magnetic recording, comprising:

a non-magnetic substrate;

an under layer provided on said non-magnetic substrate; and a first magnetic layer provided above said under layer, said first magnetic layer comprising a Co alloy layer of a system Co—$Cr_\beta$—$Pt_\gamma$—$B_\delta$—$Cu_\epsilon$, said Co alloy layer having a thickness t and a remnant magnetic flux density $B_r$ satisfying a relationship for a product ($t \times B_r$) as $$2.0 \; nT \cdot m \leq (t \times B_r) \leq 7.0 \; nT \cdot m,$$

said Co alloy layer containing, in addition to Co, Cr with a concentration $\beta$ of 20–26 at % (20 at % $\leq \beta \leq$ 26 at %), Pt with a concentration $\gamma$ of 6–20 at % (6 at % $\leq \gamma \leq$ 20 at %), B with a concentration $\delta$ of 1–7 at % (1 at % $\leq \delta \leq$ 7 at %), and Cu with a concentration $\epsilon$ of 2–7 at % (2 at % $\leq \epsilon \leq$ 7 at %), said magnetic storage medium including an additional magnetic layer directly adjacent to said first magnetic layer, said additional magnetic layer comprising an alloy of any of a system of Co—Cr—Pt—B—Cu or a system of Co—Cr—Pt—B.

2. A magnetic storage medium as claimed in claim 1, wherein said first magnetic layer contains Cu with a concentration $\epsilon$ of 3–7 at % (3 at % $\leq \epsilon \leq$ 7 at %).

3. A magnetic storage medium as claimed in claim 1, wherein said first magnetic layer contains Cu with a concentration $\epsilon$ of 4–6 at % (4 at % $\leq \epsilon \leq$ 6 at %).

4. A magnetic storage medium as claimed in claim 1, wherein said first magnetic layer contains B with a concentration $\delta$ of 2–6 at % (2 at % $\leq \delta \leq$ 6 at %).

5. A magnetic storage medium as claimed in claim 1, wherein said first magnetic layer contains Co, Cr, Pr, B and Cu with respective concentrations of 59 at %, $\beta$=20 at %, $\gamma$=10 at %, $\delta$=6 at % and $\epsilon$=5 at %.

6. A magnetic storage medium as claimed in claim 1, wherein said first magnetic layer contains Cr, Pt, B and Cu with respective concentrations of $\beta$=24 at %, $\gamma$=9 at %, $\delta$=4 at % and $\epsilon$=2–7 at %.

7. A magnetic storage medium as claimed in claim 1, wherein said first magnetic layer and said additional magnetic layer have a common composition.

8. A magnetic storage medium as claimed in claim 1, wherein said first magnetic layer and said additional magnetic layer have mutually different compositions.

9. A magnetic storage medium as claimed in claim 1, wherein said additional magnetic layer is provided above said first magnetic layer.

10. A magnetic storage medium as claimed in claim 1, wherein said additional magnetic layer is provided below said first magnetic layer.

11. A magnetic storage medium as claimed in claim 1, wherein said under layer comprises a Cr alloy containing, in addition to Cr, at least an element selected from the group consisting of Mo, Ta, Ti, W and V.

12. A magnetic storage medium as claimed in claim 11, further comprising an additional under layer of Cr between said substrate and said under layer.

13. A magnetic storage medium as claimed in claim 1, wherein said under layer comprises a first Cr alloy containing Cr with a fast concentration, said magnetic storage medium further comprising an additional under layer between said substrate and said under layer, said additional under layer comprising a second Cr alloy containing Cr with a second, larger concentration.

14. A magnetic storage medium as claimed in claim 1, further comprising an intermediate layer of a Co alloy between said under layer and said first magnetic layer, said intermediate layer having a saturation flux density of 0.4–0.6T.

15. A method of forming a longitudinal-mode magnetic storage medium, comprising the steps of:

depositing an under layer of a Cr alloy on a non-magnetic substrate at a temperature in a range of 160–300° C.;

depositing a first magnetic layer of a Co alloy in a system Co—Cr—Pt—B—Cu such that said Co alloy layer containing, in addition to Co, Cr with a concentration $\beta$ of 20–26 at % (20 at % $\leq \beta \leq$ 26 at %), Pt with a concentration $\gamma$ of 6–20 at % (6 at % $\leq \gamma \leq$ 20 at %), B with a concentration $\delta$ of 1–7 at % (1 at % $\leq \delta \leq$ 7 at %), and Cu with a concentration $\epsilon$ of 2–7 at % (2 at % $\leq \epsilon \leq$ 7 at %), and such that said first magnetic layer has a thickness t and a remnant magnetic flux density $B_r$ so as to satisfy a relationship ($t \times B_r$)

$$2.0 \; nT \cdot m \leq (t \times B_r) \leq 7.0 \; nT \cdot m, \text{ and}$$

depositing an additional magnetic layer directly adjacent to said first magnetic layer, said additional magnetic layer comprising an alloy of any of a system of Co—Cr—Pt—B—Cu or a system of Co—Cr—Pt—B.

16. A magnetic storage apparatus, comprising:
a rotatable magnetic disk for longitudinal magnetic recording;
a motor rotating said magnetic disk;
a magnetic head scanning a surface of said magnetic disk, and
an actuator carrying said magnetic head, said actuator causing said magnetic head to scan over said surface of said rotatable magnetic disk,
said magnetic disk comprising:
  a non-magnetic substrate;
  an under layer provided on said non-magnetic substrate; and
  a first magnetic layer provided above said under layer, said first magnetic layer comprising a Co alloy layer of a system Co—Cr$_\beta$—Pt$_\gamma$—B$_\delta$—Cu$_\epsilon$,
  said Co alloy layer having a thickness t and a remnant magnetic flux density $B_r$ satisfying a relationship for a product ($t \times B_r$) as $$2.0\ nT \cdot m \leq (t \times B_r) \leq 7.0\ nT \cdot m,$$

said Co alloy layer containing, in addition to Co, Cr with a concentration $\beta$ of 20–26 at % (20 at % $\leq \beta \leq$ 26 at %), Pt with a concentration $\gamma$ of 6–20 at % (6 at % $\leq \gamma \leq$ 20 at %), B with a concentration $\delta$ of 1–7 at % (1 at % $\leq \delta \leq$ 7 at %), and Cu with a concentration $\epsilon$ of 2–7 at % (2 at % $\leq \epsilon \leq$ 7 at %),
said magnetic storage medium including an additional magnetic layer directly adjacent to said first magnetic layer,
said additional magnetic layer comprising an alloy of any of a system of Co—Cr—Pt—B—Cu or a system of Co—Cr—Pt—B.

* * * * *

UNITED STATES PATENT AND TRADEMARK OFFICE
CERTIFICATE OF CORRECTION

PATENT NO.   : 6,682,834 B2
DATED        : January 27, 2004
INVENTOR(S)  : Okuyama et al.

It is certified that error appears in the above-identified patent and that said Letters Patent is hereby corrected as shown below:

<u>Column 1,</u>
Line 27, replace "$Pw_{50} = (2(a + d)^2 + (a/2)^2)^{1/2}$" with -- $Pw_{50} = (2(a+d)^2 + (a/2)^2)^{1/2}$ --. (remove italics)
Line 29, replace "$a \propto (t \times B_r / H_c)^{1/2}$" with -- $a \propto (t \times B_r/H_c)^{1/2}$ --. (remove italics)

<u>Column 2,</u>
Line 24, replace "$\tau^{-1} = f_0 \exp(-\Delta E / kT)$" with -- $\tau^{-1} = f_0 \exp(-\Delta E/kT)$ --. (remove italics)
Line 25, replace "$\Delta E = K_u \cdot V \cdot (1 - H/H_0)^{1/n}; n = 2/3,$" with
-- $\Delta E = K \cdot V \cdot (1 - H/H_0)^{1/n}; n = 2/3$, --. (remove italics)
Line 26, replace "$\Delta E = K_u = H_k \cdot M_s / 2, H = H_e + H_d,$" with
-- $\Delta E = K_u = H_k \cdot M_s / 2, H = H_e + H_d$, --. (remove italics)
Line 59, replace "$H_{cr}/H_0 = 1 - \{C \cdot \ln(f_0 \cdot t_{im}/\ln 2)\}^m$" with
-- $H_{cr}/H_0 = 1 - \{C \cdot \ln(f_0 t_{im}/\ln 2)\}^n$ --. (remove italics)
Line 60, replace "$C^{-1} = \Delta E / kT$" with -- $C^{-1} = \Delta E / kT$ --. (remove italics)

<u>Column 3,</u>
Line 33, replace "$2.0 nT \cdot m \leq (txB,) \leq 7.0 nT \cdot m$," with
-- $2.0 nT \cdot m \leq (txB,) \leq 7.0 nT \cdot m$, --. (remove italics)

<u>Column 13,</u>
Line 49, replace "Co—$Cr_\beta$—$Pt_\gamma$—$B_\delta$—$Cu_\varepsilon$," with -- Co—$Cr_\beta$—$Pt_\gamma$—$B_\delta$—$Cu_\varepsilon$, --.
Line 54, replace "$2.0 nT \cdot m \leq (txB,) \leq 7.0 nT \cdot m$," with
-- $2.0 nT \cdot m \leq (txB,) \leq 7.0 nT \cdot m$, --. (remove italics)

<u>Column 15,</u>
Line 21, replace "Co—$Cr_\beta$—$Pt_\gamma$—$B_\delta$—$Cu_\varepsilon$," with -- Co—$Cr_\beta$—$Pt_\gamma$—$B_\delta$—$Cu_\varepsilon$, --.

UNITED STATES PATENT AND TRADEMARK OFFICE
CERTIFICATE OF CORRECTION

PATENT NO. : 6,682,834 B2
DATED : January 27, 2004
INVENTOR(S) : Okuyama et al.

It is certified that error appears in the above-identified patent and that said Letters Patent is hereby corrected as shown below:

Column 16,
Line 5, replace "$2.0 \mathrm{n} T \cdot m \leq (txB,) \leq 7.0 \mathrm{n} T \cdot m,$" with
-- $2.0 \mathrm{nT} \cdot \mathrm{m} \leq (\mathrm{txB},) \leq 7.0 \mathrm{nT} \cdot \mathrm{m},$ --. (remove italics)

Signed and Sealed this

Thirteenth Day of July, 2004

JON W. DUDAS
*Acting Director of the United States Patent and Trademark Office*